March 31, 1936.                  C. F. VINING                    2,035,732
                          MILK PASTEURIZING ASSEMBLY
                            Filed March 12, 1934
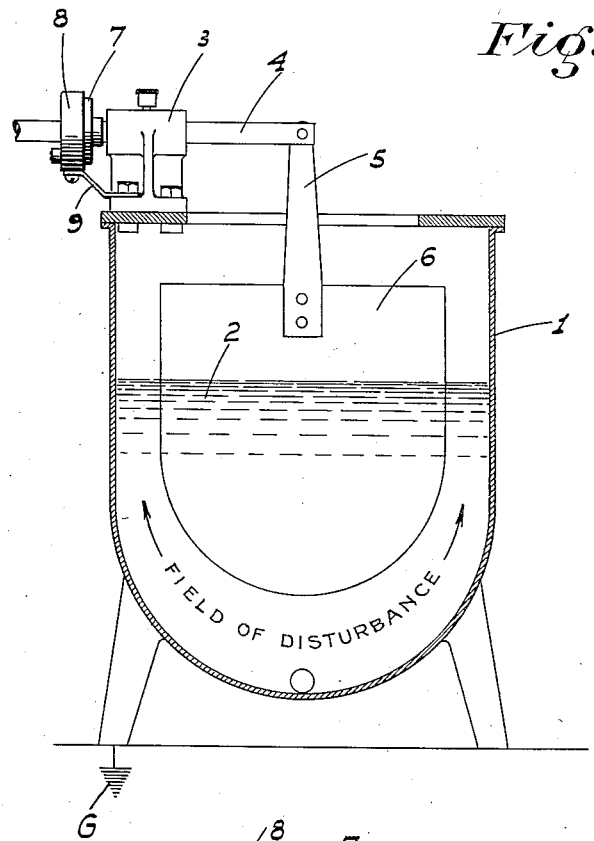
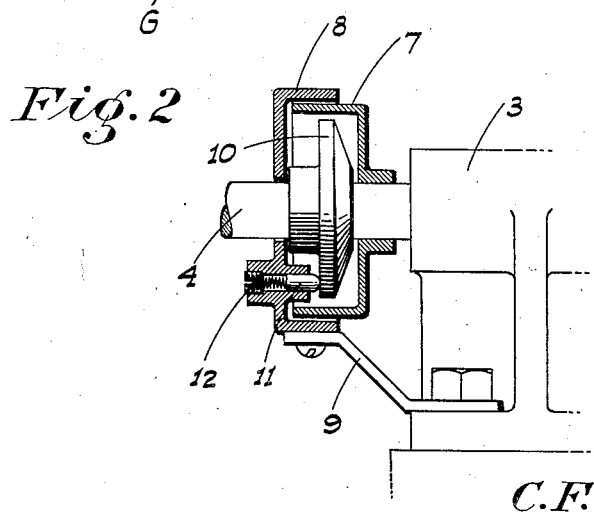
INVENTOR
*C. F. Vining*
BY
        ATTORNEY Patented Mar. 31, 1936

2,035,732

UNITED STATES PATENT OFFICE 2,035,732

MILK PASTEURIZING ASSEMBLY

Carl F. Vining, Sacramento, Calif.

Application March 12, 1934, Serial No. 715,254

2 Claims. (Cl. 204—24)

This invention relates to a method of removing electrical currents set up in equipment of various kinds, such as milk pasteurizers, pumps and other instrumentalities in which metallic parts are movable through liquids, the present description of the method being directed particularly to a description of how these disturbing electrical currents arise in connection with milk pasteurizers and to such an extent as to deleteriously affect the taste of the milk. In instrumentalities of the character mentioned the milk is placed in vats and then agitated back and forth by a paddle in order to bring the milk into contact with the heated walls of the vat. The vat itself is usually metallic, as well as the paddle.

The movement of the paddle back and forth through the milk from some cause not exactly understood, but presumptively the action of the metal moving through the acids or other susceptible substances in the milk, sets up an electrolysis which, unless disposed of, etches into or eats away the metal of the paddle and this distributes a metallic substance through the milk and tends to seriously affect the taste thereof.

It is the object therefore of the present invention to devise a method and means whereby the electrical currents thus generated may be rapidly dissipated by conducting them from the vat before there is any movement thereof through the liquid and thus prevent the action on the metal parts which affects the taste of the milk.

In order to illustrate the method, I have shown a diagrammatic outline of a vat and a paddle movable therein together with means associated therewith whereby any disturbing electrical currents set up through the action of the paddle moving through the milk are immediately conducted away from the paddle and dissipated before any detrimental action on the metal of the paddle may be had.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 designates a transverse section through the vat showing the paddle and operating means and one type of current dissipating mechanism connected therewith.

Figure 2 is a vertical section through the mechanism whereby the currents are withdrawn from the mechanism.

Referring now particularly to the characters of reference on the drawing, the numeral 1 diagrammatically designates a pasteurizing vat into which is poured the milk 2 for the purpose of pasteurization. Associated with the vat is a bearing 3 of any type in which is movable a shaft 4 having a connecting rod 5 from which is suspended the agitating paddle 6.

In passing, attention might be directed to the fact that after the mechanism has been in use the lubricant fed to the bearing 3, in order to avoid friction of the shaft moving therein, creates a film of oil or grease around the shaft which effectively insulates the shaft from the bearing.

In the present instance the shaft 4 rocks back and forth in the bearing 3 and through the medium of the rod 5 swings the paddle 6 back and forth through the liquid. This action of the paddle through the milk, for reasons unknown to me, sets up an electrolysis producing very pronounced electrical currents. If not disposed of these currents tend to pass from the paddle 6 to the walls of the vat 1 through the milk 2 and the action of this passing current against the paddle 6 in the presence of the milk is such as to eat away the metal of the paddle 6 and pass it through the milk. This badly affects the taste of the milk which assumes a very metallic taste.

After a considerable study of the situation and experimentation I have worked out a method whereby the currents as fast as they are generated are conducted away from the vat through the paddle 6, connecting rod 5, shaft 4 and to the ground through the medium of an instrumentality connected with the shaft and operable to withdraw the electrical currents regardless of any rotary or partial rotary movement of the shaft. This mechanism comprises primarily a housing disposed around the shaft and comprising one shell 7 fixed to the shaft and a complementary shell 8 telescoping over the side walls of the shell 7. The complementary shell is supported in a suitable manner as by a bracket 9 with any suitable means connecting it with the ground, shown preferably in the drawing as being mounted on the body of the vat 1. Fixed to the shaft 4 within this housing is a wiping disk 10. Mounted in the wall of the housing 8 is a spring pressed brush 11 which is provided with an adjustment screw 12. This brush 11 bears against the face of the disk 10 either with a complete rotation of the shaft 4 or a back and forth movement thereof.

By means of the assembly shown, or other equivalent assembly, the currents which are generated by the movement of the paddle 6 through the liquid 2 are constantly dissipated from the paddle through the connecting rod 5, the shaft 4, disk 10, brush 11, arm 9 and through the body of the vat 1 to the ground, marked on the drawing G.

By reason of the arrangement and dissipation of the currents in this manner the currents are prevented from flowing from the paddle 6 through the liquid 2 to the body 1 of the vat. It is this latter flow of the current which sets up an electrolysis and tends to effect an action between the elements 6 and 1 which carries metallic substances through the milk and seriously taints the milk with a metallic flavor.

While I have definitely shown one assembly of an instrumentality by which contact may be made between the movable shaft 4 and the ground, it will be obvious that other equivalent structures may be adapted for that purpose since I do not desire to be understood to limit myself to the specific mechanism shown and disclosed, the important feature of the invention being the method of diverting the disturbing currents out of the liquid and to the ground as fast as they are generated so as to prevent their passing through the liquid 2 and effecting the deleterious results noted.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A milk pasteurizing assembly comprising a metal container for the milk to be pasteurized, a metal agitator depending into the container and milk therein, metal means to actuate and directly supporting the agitator whereby an electric current is generated normally tending to flow through the milk between the agitator and container, and current conducting means between the container and said metal supporting means and included in part with the latter, and arranged to provide a permanently uninterrupted current conducting lead between the container and agitator having a resistance less than that of the milk.

2. A milk pasteurizing assembly comprising a metal container for the milk to be pasteurized, a metal agitator depending into the container and milk therein, whereby an electric current is set up with the operation of the agitator normally tending to flow through the milk between the agitator and container, and means providing an unbroken current conducting lead between the agitator and container and having a resistance less than that of the milk.

CARL F. VINING.